US006545445B1

United States Patent
McDermott et al.

(10) Patent No.: US 6,545,445 B1
(45) Date of Patent: Apr. 8, 2003

(54) MULTIPLE BATTERY SYSTEM AND METHOD

(75) Inventors: Joseph K. McDermott, Littleton, CO (US); James W. Wagner, Arvada, CO (US); Richard T. Johnson, Arvada, CO (US); James W. Spencer, Lakewood, CO (US); Daniel A. Schwob, Boulder, CO (US); Paul C. Brantner, Conifer, CO (US); Art S. Homa, Broomfield, CO (US)

(73) Assignee: GP Batteries International, Ltd., San Diego, CA (US)

( * ) Notice: Subject to any disclaimer, the term of this patent is extended or adjusted under 35 U.S.C. 154(b) by 0 days.

(21) Appl. No.: 09/566,766

(22) Filed: May 8, 2000

(51) Int. Cl.$^7$ ................................................ H02J 7/00
(52) U.S. Cl. ........................................................ 320/103
(58) Field of Search ................................. 320/103, 126, 320/124

(56) References Cited

U.S. PATENT DOCUMENTS 5,963,010 A * 10/1999 Hayashi et al. ............. 320/106
6,229,279 B1 * 5/2001 Dierker ....................... 320/104
6,275,001 B1 * 8/2001 Dierker ....................... 320/103

* cited by examiner

*Primary Examiner*—Gregory J. Toatley, Jr.
(74) *Attorney, Agent, or Firm*—Procopio, Cory, Hargreaves & Savitch, LLP (57) ABSTRACT

A multiple battery system and method for starting internal combustion engines, such as on a boat or vehicle, and for powering auxiliary functions that operate primarily when the engine is not running is disclosed. A first battery is used for starting the engine. A second battery is used to power the auxiliary features associated with the boat or vehicle primarily when the engine is not running. The first battery, referred to as the starter battery, is a high output battery that produces high bursts of energy for limited amounts of time. The second battery, referred to as the auxiliary battery, has a low power output over a fairly long period of time, is capable of being completely drained without harming the battery, and is capable of being fully recharged. The starter battery and the auxiliary battery are connected by a circuit that has an on/off switch controlled by an electronics control module. The auxiliary battery is always on line in the circuit. The electronics control module monitors the circuit to detect certain parameters, such as a start engine event. When a start engine event is detected, the electronics control module connects the starter battery to the circuit with the switch. When the start event is over, the electronics control module disconnects the starter battery from the circuit with the switch. Thus, the electronics control module prevents the starter battery from being drained when power is being drawn from the auxiliary battery during non-start events.

6 Claims, 8 Drawing Sheets

MULTIPLE BATTERY SYSTEM AND METHOD

FIELD OF THE INVENTION

This invention relates to batteries and more particularly to batteries used to start internal combustion engines. Even more particularly, the invention relates to batteries used to start internal combustion engines that also provide power for auxiliary functions when the engine is off.

BACKGROUND OF THE INVENTION

Presently, many types of boats and vehicles, such as recreational vehicles, ambulances, police cars, fire trucks, tow trucks, and semi tractor-trailer trucks, are normally powered with a single battery or a bank of batteries. The term "battery" as used in this application refers to any electrical energy storage device including, but not limited to, a battery, a capacitor, a super capacitor, etc. The operator of the boat or vehicle may periodically turn off the engine and continue to use the battery to power auxiliary features of the boat or vehicle, such as, but not limited to, lights, two-way radio, telephone, stereo, television, loud speaker, electric blanket, pump, tail gate lift, and/or winch. Since the boat or vehicle engine is not running, the alternator is not recharging the battery while the operator is using these auxiliary features. The battery is continuously drained while powering these auxiliary features. If the battery is drained too much, there may be insufficient power remaining to restart the engine of the boat or vehicle.

Traditionally, in such instances where there is not enough power to restart the engine, or in the case where the battery has gone completely dead, the operator of the boat or vehicle has several options to choose from to restart the engine. First, the operator could simply replace the battery. But unless the operator has a spare battery on the boat or vehicle, getting a new battery may be difficult to do, especially if the operator is stranded in a remote location. Second, the operator could try to "jumpstart" the dead or weak battery. Jumpstarting involves attaching jumper cables between the battery of a second boat or vehicle that is running to the dead or weak battery. This solution puts the operator at the mercy of a passing boater or motorist, or having to wait until a tow truck or rescue boat can be summoned. Thirdly, in a similar jumpstarting operation, the operator could attach a portable power supply to jumpstart the dead or weak battery. Such portable power supplies are known, for example, from U.S. Pat. No. 5,589,292 and U.S. Pat. No. 5,993,983. However, this solution requires the expense of purchasing the portable power supply, the operator must remember to keep the portable power supply in the boat or vehicle, and after one or more uses, the operator must remember to recharge the portable power supply.

In the absence of being prepared to utilize the above mentioned solutions, the operator should only use the auxiliary features of the boat or vehicle for a limited amount of time while the engine is not running to ensure that enough power will be available in the battery to start the engine. However, this is problematic because the operator will only be able to use the boat or vehicle's auxiliary features for a limited amount of time. In addition, it may be difficult for the operator to judge how long the boat or vehicle's auxiliary features powered by the battery may be used and still leave enough power to start the engine.

SUMMARY OF THE INVENTION

Therefore, it is an aspect of the present invention to provide a multiple battery system and method to provide assured power for starting internal combustion engines.

It is another aspect of the present invention to provide a multiple battery system and method to start internal combustion engines and provide maximum power to auxiliary functions when the engine is not running.

It is yet another aspect of the present invention to provide a multiple battery system and method where a first battery is used to start an internal combustion engine and a second battery is used to power auxiliary functions when the engine is not running.

Still another aspect of the present invention is to provide a multiple battery system and method where a first battery used to start an internal combustion engine is switchably connected to a second battery used to power auxiliary functions when the engine is not running.

Yet still another aspect of the present invention is to provide a multiple battery system and method that automatically selects between a first battery and a second battery by monitoring circuit parameters.

A further aspect of the present invention is to provide a multiple battery system and method where additional batteries may be connected to the multiple battery system.

A still further aspect of the present invention is to provide a multiple battery system and method that displays the charge status of a first battery and the charge status of a second or more batteries in the multiple battery system.

It is yet another aspect of the present invention to provide a multiple battery system and method that displays the charge status of a first battery and the charge status of a second battery in the multiple battery system, and the charge status of additional batteries connectable to the multiple battery system.

It is yet another aspect of the present invention to provide a multiple battery system and method that optimizes recharging of a first battery and optimizes recharging of a second battery in the multiple battery system.

Another aspect of the present invention is to provide a multiple battery system and method that optimizes recharging of a first battery and optimizes recharging of a second battery in the multiple battery system, and optimizes the recharging of additional batteries connectable to the multiple battery system.

Another aspect of the invention is to provide a multiple battery system and method that controls the discharge of one or more batteries in a multiple battery system.

Another aspect of the invention is to provide for the assurance of starting power by maintaining a high state of charge of a first battery of a multiple battery system by charging the first battery from a second or additional batteries during periods of non-operation of an internal combustion engine and charging system.

The present invention achieves one or more of these aspects by providing a multiple battery system and method for starting internal combustion engines, such as on a boat or vehicle, and powering auxiliary functions that operate primarily when the engine is not running. A first battery is used for starting the engine. A second battery is used to power the auxiliary features associated with the boat or vehicle. This invention permits an operator of the boat or vehicle to use all or nearly all of the power in the boat's second battery while the engine is turned off. The first battery, referred to as the starter battery, is used to start the engine. In one aspect of the invention, the starter battery is a thin metal film battery ("TMF®" battery) described in U.S. Pat. No. 5,047,300 which is herein incorporated by reference for all that is taught and disclosed therein. The TMF® battery is a high output battery that produces high bursts of energy for limited amounts of time.

The second battery, referred to as the auxiliary battery, is used to power auxiliary features and functions when the engine is not running. In one aspect of the invention, the auxiliary battery is a standard deep cycle battery. A deep cycle battery has a low power output over a fairly long period of time, is capable of being completely drained without harming the battery, and is capable of being fully recharged. The starter battery and the auxiliary battery are connected by a circuit that has an on/off switch controlled by an electronics control module. The auxiliary battery is typically on line in the circuit. The electronics control module monitors the circuit to detect a start engine event. When a start engine event is detected, the electronics control module connects the starter battery to the circuit with the switch. When the start event is over, and/or a controlled amount of recharge has occurred, the electronics control module disconnects the starter battery from the circuit with the switch. Thus, the electronics control module prevents the starter battery from being drained when power is being drawn from the auxiliary battery during non-start events.

In different embodiments, the multiple battery system of the present invention may have a display to show the amount of power remaining in the auxiliary battery. The display may be one or more LED lights, a liquid crystal display, or any other suitable visual display device. In addition, the multiple battery system may have a test button which allows a user to test the amount of power remaining in the starter battery. Finally, the multiple battery system may have a cable connection which permits the operator to connect an external display device to the dual battery, whereby the external display shows information regarding the status of the starter battery and the auxiliary battery. An audible beep or tone may also be utilized to indicate battery status.

In use, the starter battery and the auxiliary battery are initially fully charged. When the boat or vehicle engine is running, the alternator charges both the starter battery and the auxiliary battery. When the boat or vehicle engine is turned off, the circuit switch between the starter battery and the auxiliary battery removes the starter battery from the circuit so that neither the direct current loads and/or the auxiliary battery can drain power from the starter battery. The operator can then use the auxiliary features and functions on the boat or vehicle, powering these features and functions with the auxiliary battery. However, the operator does not have to worry about conserving enough power in the auxiliary battery to start the engine, but can power the auxiliary features and functions until the auxiliary battery is fully drained and the features cease to work. Then, when the operator wants to start the engine, the electronics control module detects the start event and connects the starter battery to the circuit with the switch and the starter battery starts the engine. When the engine is running, the alternator once again recharges both the starter battery and the auxiliary battery. Therefore, since the auxiliary battery is not needed to start the engine, there is no danger that the operator may use too much power from the auxiliary battery and thus be unable to start the engine.

BRIEF DESCRIPTION OF THE DRAWINGS

The above and other aspects, features, and advantages of the invention will be better understood by reading the following more particular description of the invention, presented in conjunction with the following drawings, wherein.

DETAILED DESCRIPTION OF THE INVENTION

The following description is of the best presently contemplated mode of carrying out he present invention. This description is not to be taken in a limiting sense but is made merely for the purpose of describing the general principles of the invention. The scope of the invention should be determined by referencing the appended claims.

Figure 1:
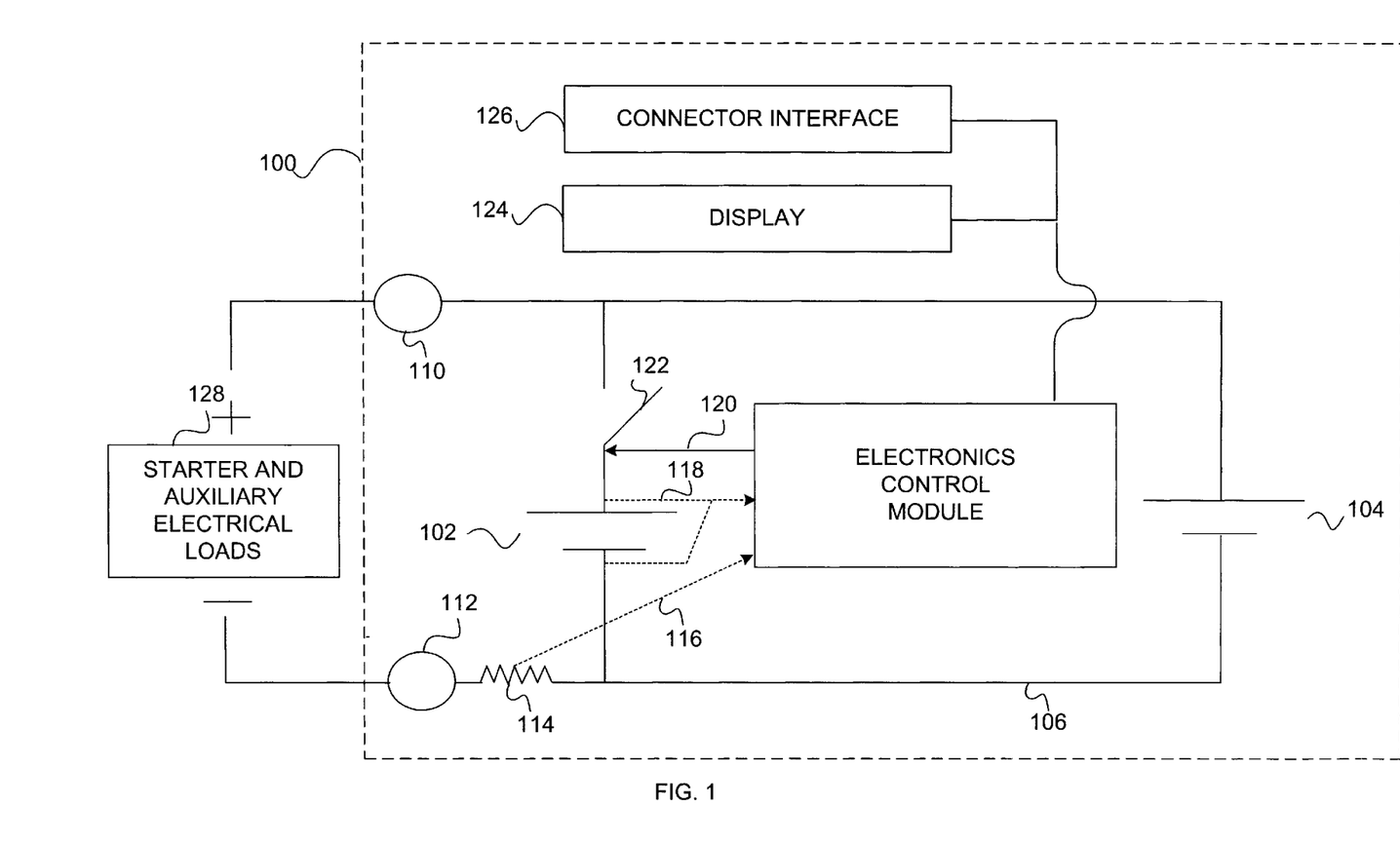
FIG. 1 shows a schematic/block diagram of the multiple battery system of the present invention.

FIG. 1 shows a schematic/block diagram of the multiple battery system of the present invention. Referring now to FIG. 1, multiple battery system 100 has starter battery 102 and auxiliary battery 104 connected by parallel circuit 106. Starter battery 102 is typically a high output, low impedance battery, such as a TMF® battery. Auxiliary battery 104 is a typically a deep cycle battery which provides low power output over an extended period of time.

Electronics control module 108 monitors parallel circuit 106 for various parameters, including a start event. Electronics control module 108 may be a microprocessor, PROM, EPROM, or any other suitable processing device. Electronics control module 108 receives current input 116 from shunt 114, and voltage input 118 from starter battery 102. Upon detecting a start event, electronics control module 108 sends a close switch signal via switch control 120 to high current switch 122, connecting starter battery 102 to parallel circuit 106. Between positive terminal 110 and negative terminal 112 is starter and auxiliary electrical loads 128.

Electronics control module 108 can control the discharge of starter battery 102 and auxiliary battery 104. The amount of discharge of starter battery 102 may be restricted by electronics control module 108 sending an open switch signal at a predetermined time or based upon monitored parameters. Electronics control module 108 may control the discharge of auxiliary battery 104 in a similar fashion.

The display 124 displays the charge status of starter battery 102 and auxiliary battery 104. Connector interface 126 allows a cable to be connected to multiple battery system 100 that connects to a remote display panel (not shown in FIG. 1). The remote display panel may be positioned in a place convenient to the operator, such as an existing instrument panel, in order to more conveniently display the charge status of starter battery 102 and auxiliary battery 104.

Electronics control module 108 also monitors parallel circuit 106 to determine when charging current is available. If either starter battery 102 or auxiliary battery 104 needs recharging, electronics control module 108 optimizes the recharging process by maintaining an optimal recharge protocol and decreasing the current as battery 102 or auxiliary battery 104 charge back up. For example, starter battery 102 may be charged by auxiliary battery 104 during periods of non-operation of the vehicle or boat engine and charging system. Electronics control module 108 controls the electronic voltage conversion from a level achieved during discharge of auxiliary battery 104 to a higher voltage required to charge starter battery 102. In another embodiment, the operating voltage of starter battery 102 is less than auxiliary battery 104. This may be achieved by a reduction in the number of cells in starter battery 102 from six to five, or in the more generic case, from n to n–1 cells. The charging current is controlled by electronics control module 108 opening and closing a switch within electronics control module 108 as appropriate to the state of charge of starter battery 102.

Figure 2:
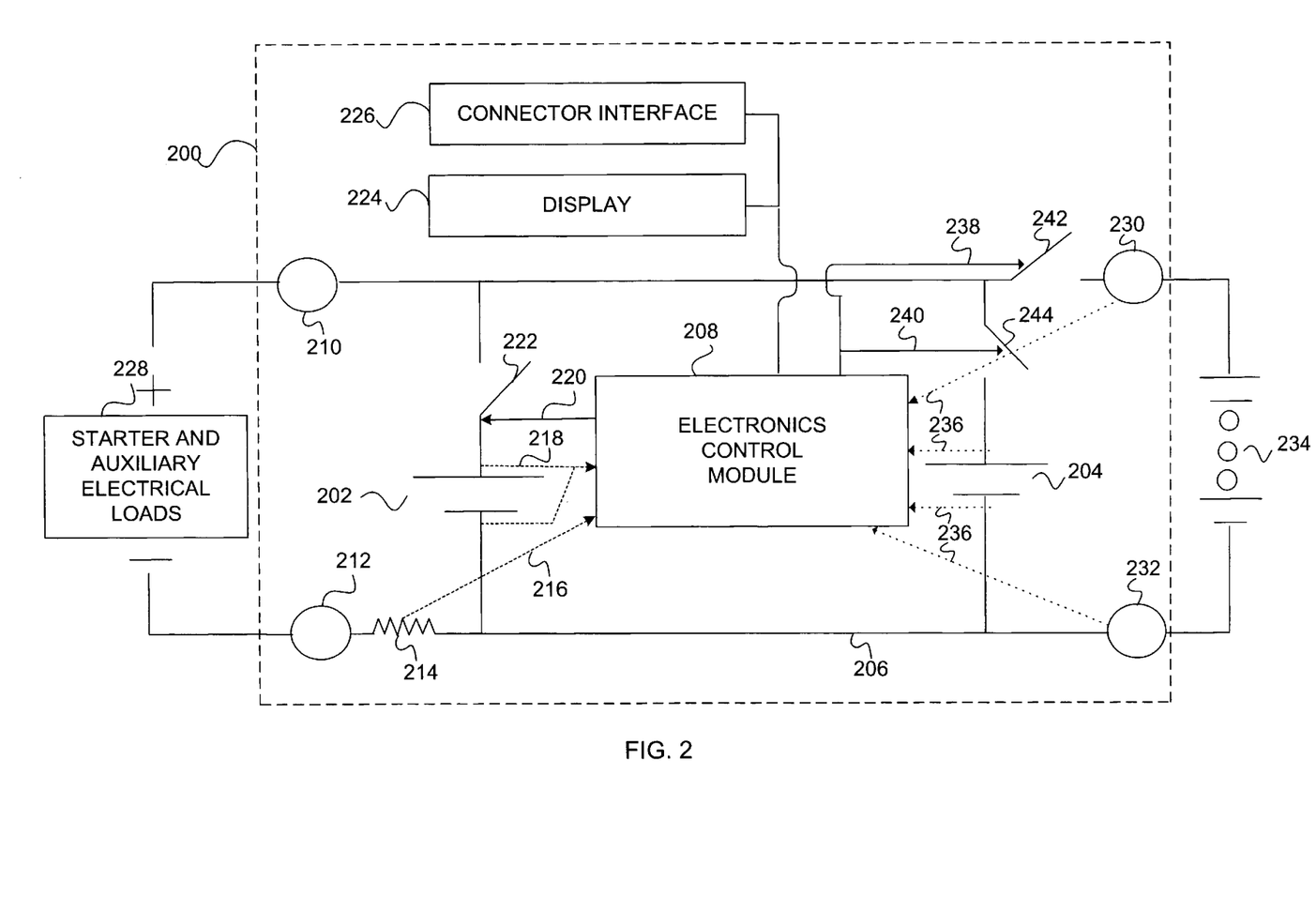
FIG. 2 shows a schematic/block diagram of the multiple battery system of the present invention with one or more additional connected batteries.

FIG. 2 shows a schematic/block diagram of the multiple battery system of the present invention with one or more additional connected batteries. Referring now to FIG. 2, multiple battery system 200 has components 202 through 228 that correspond to similarly identified components 102 through 128 in FIG. 1, including starter battery 202, auxiliary battery 204, parallel circuit 206, electronics control module 208, positive terminal 210, negative terminal 212, shunt 214, current input 216, voltage input 218, switch control 220, high current switch 222, display 224, connector interface 226, and starter and auxiliary electrical loads 228. In addition, multiple battery system 200 has additional terminals 230 and 232 between which one or more additional batteries 234 are connected in parallel to starter battery 202 and auxiliary battery 204 in parallel circuit 206. Electronics control module 208 receives additional voltage inputs 236. Electronics control module 208 can send close switch and open switch signals via switch control 238 and switch control 240 to high current switches 242 and 244 in order connect or disconnect auxiliary battery 204 or additional batteries 234 to parallel circuit 206. Electronics control module 208 can control the discharge of starter battery 202, auxiliary battery 204, and additional batteries 234. The amount of discharge of starter battery 202 may be restricted by electronics control module 208 sending an open switch signal at a predetermined time or based upon monitored parameters. Electronics control module 208 may control the discharge of auxiliary battery 204 in a similar fashion. The passage of energy from auxiliary battery 204 to additional batteries 234 or their electrical loads may also be controlled by electronics control module 208 to optimize the availability of energy from auxiliary battery 204 based on the priority of electrical loads connected to auxiliary battery 204.

Electronics control module 208 can also optimize the recharging of starter battery 202, auxiliary battery 204, and additional batteries 234 in the similar manner described above. For example, starter battery 202 may be charged by auxiliary battery 204 or additional batteries 234 during periods of non-operation of the vehicle or boat engine and charging system. Electronics control module 208 controls the electronic voltage conversion from a level achieved during discharge of auxiliary battery 204 to a higher voltage required to charge starter battery 202. In another embodiment, the operating voltage of starter battery 202 is less than auxiliary battery 204 or additional batteries 234. This may be achieved by a reduction in the number of cells in starter battery 202 from six to five, or in the more generic case, from n to n–1 cells. The charging current is controlled by electronics control module 208 opening and closing a switch within electronics control module 208 as appropriate to the state of charge of starter battery 202.

Figure 3:
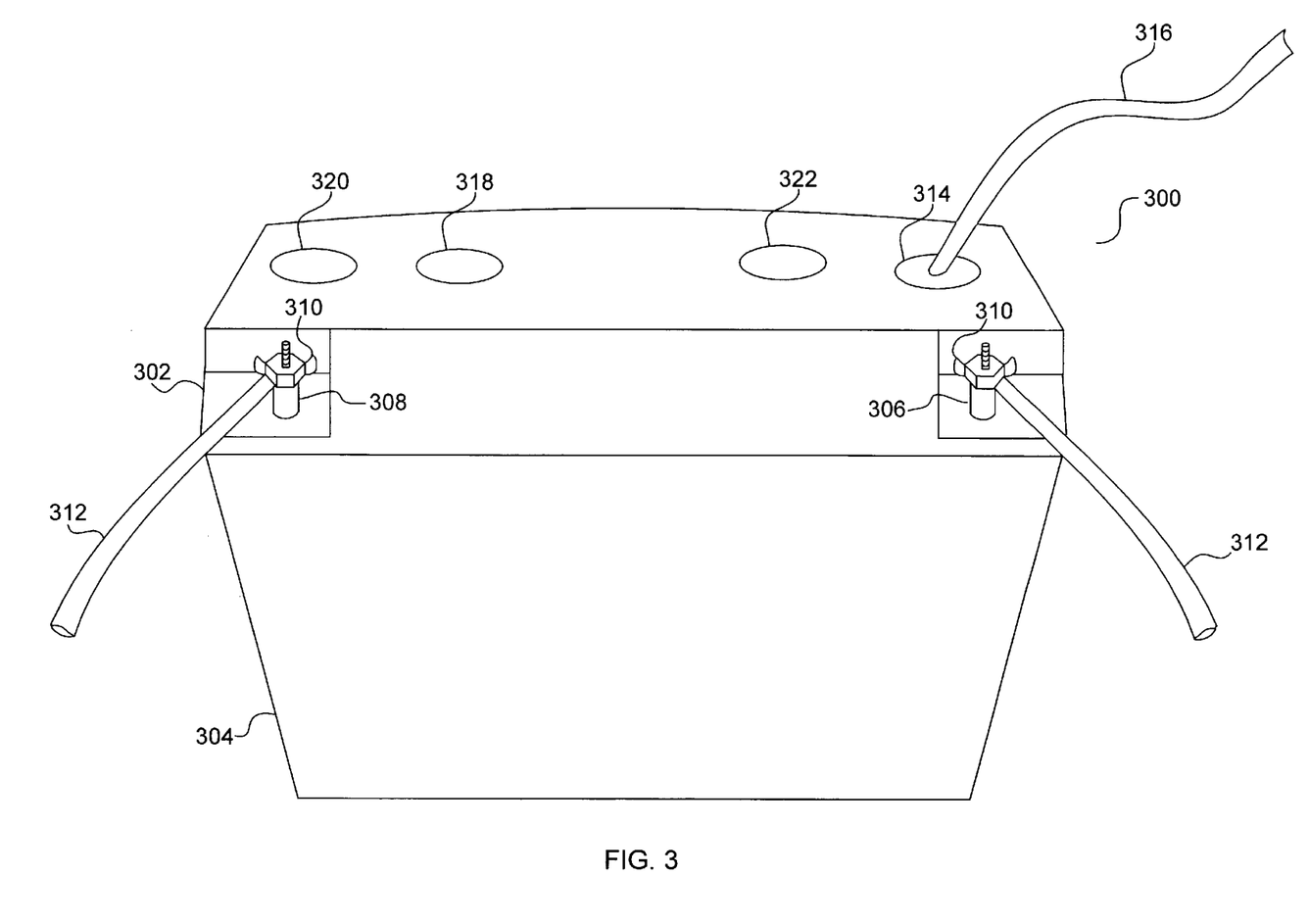
FIG. 3 shows a schematic diagram of the multiple battery system of the present invention as shown in FIG. 1 connected to a boat or vehicle electrical power system.

FIG. 3 shows a schematic diagram of the multiple battery system of the present invention as shown in FIG. 1 connected to a boat or vehicle electrical power system. Referring now to FIG. 3, multiple battery system 300 has upper housing 302 and lower housing 304. Lower housing 304 contains auxiliary battery 104 (FIG. 1). Upper housing 302 contains starter battery 102, electronics control module 108, and high current switch 122 (FIG. 1). Positive terminal 306 and negative terminal 308 each have a wing nut 310 for securing a cable 312. The terminal ends of each cable (not shown in FIG. 3) are connected to the electrical power system of a boat or vehicle (also not shown in FIG. 3).

Connecter interface 314 receives remote display panel cable 316. The terminal end of remote display panel cable 316 (not shown in FIG. 3) connects to a remote panel display (also not shown in FIG. 3). Auxiliary battery display 318 and starter battery display 320 provide visual information regarding the charge of each battery. To avoid inadvertent battery drain when the boat or vehicle is put into storage for an extended period of time, multiple battery system 300 may have storage mode switch 322, which when pressed, disconnects multiple battery system 300 from all electrical loads.

Multiple battery system 300 is shown in FIG. 3 as one integral unit containing auxiliary battery 104 and starter battery 102. One skilled in the art will recognize that auxiliary battery 104 or starter battery 102 or both may be located external to the rest of the components of multiple battery system 300.

Figure 4:
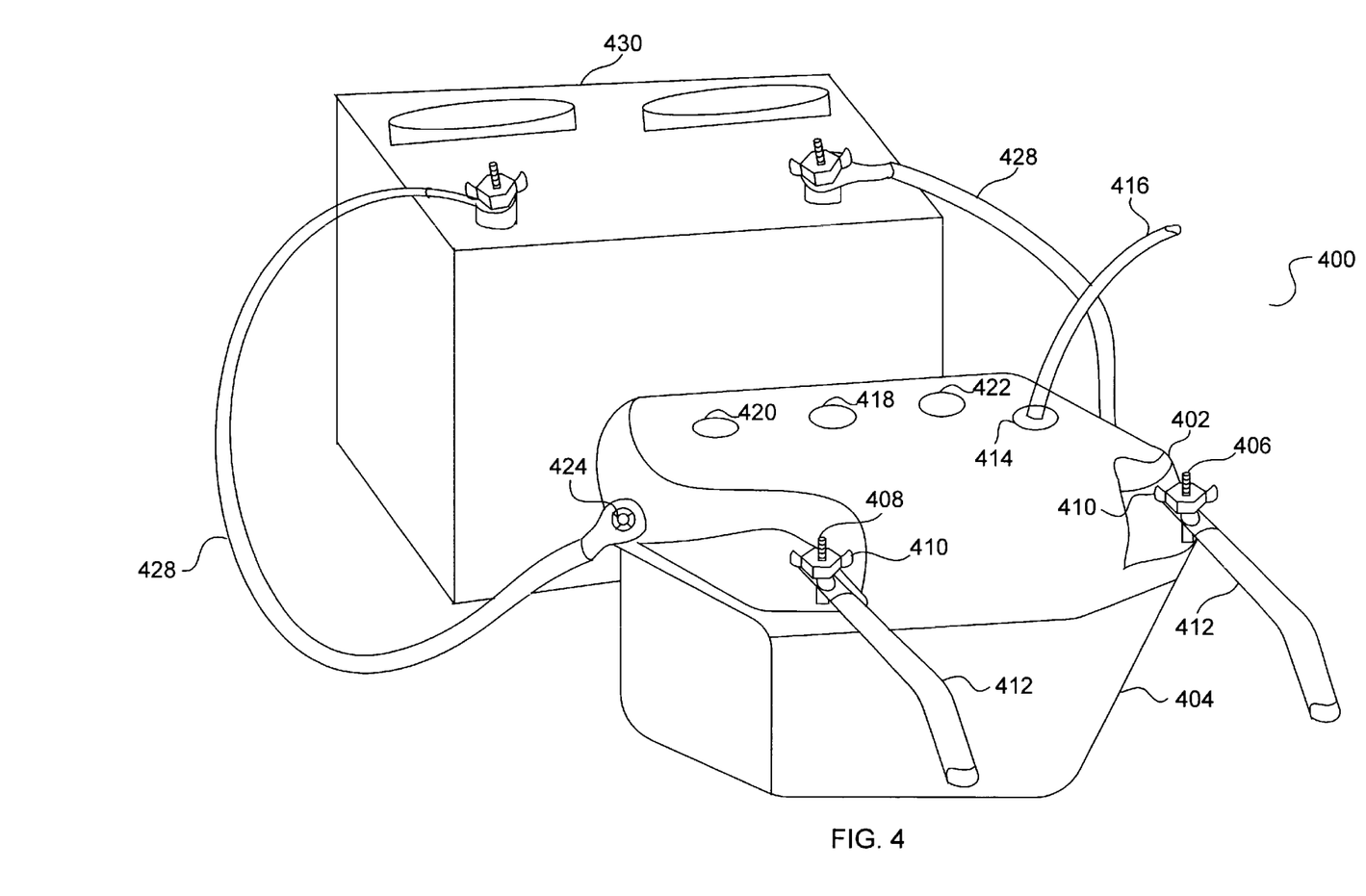
FIG. 4 shows a schematic diagram of the multiple battery system of the present invention with one or more additional connected batteries as shown in FIG. 2 connected to a boat or vehicle electrical power system.

FIG. 4 shows a schematic diagram of the multiple battery system of the present invention with one or more additional connected batteries as shown in FIG. 2 connected to a boat or vehicle electrical power system. Referring now to FIG. 4, multiple battery system 400 has components 402 through 422 that correspond to similarly identified components 302 through 322 in FIG. 3, including top housing 402, bottom housing 404, positive terminal 406, negative terminal 408, wing nuts 410, starter cables 412, connector interface 414, remote display panel cable 416, auxiliary battery display 418, starter battery display 420, storage mode switch 422. Upper housing 402 contains starter battery 102 and lower housing 404 contains auxiliary battery 104 (FIG. 1). In addition, multiple battery system 400 has additional terminal 424 and terminal 426 (not visible in FIG. 4) between which one or more additional batteries 430 are connected via connector cables 428. Only one additional battery 430 is shown in FIG. 4.

Multiple battery system 400 is shown in FIG. 4 as one integral unit containing auxiliary battery 104 and starter battery 102. One skilled in the art will recognize that auxiliary battery 104 or starter battery 102 or both may be located external to the rest of the components of multiple battery system 400.

Figure 5:
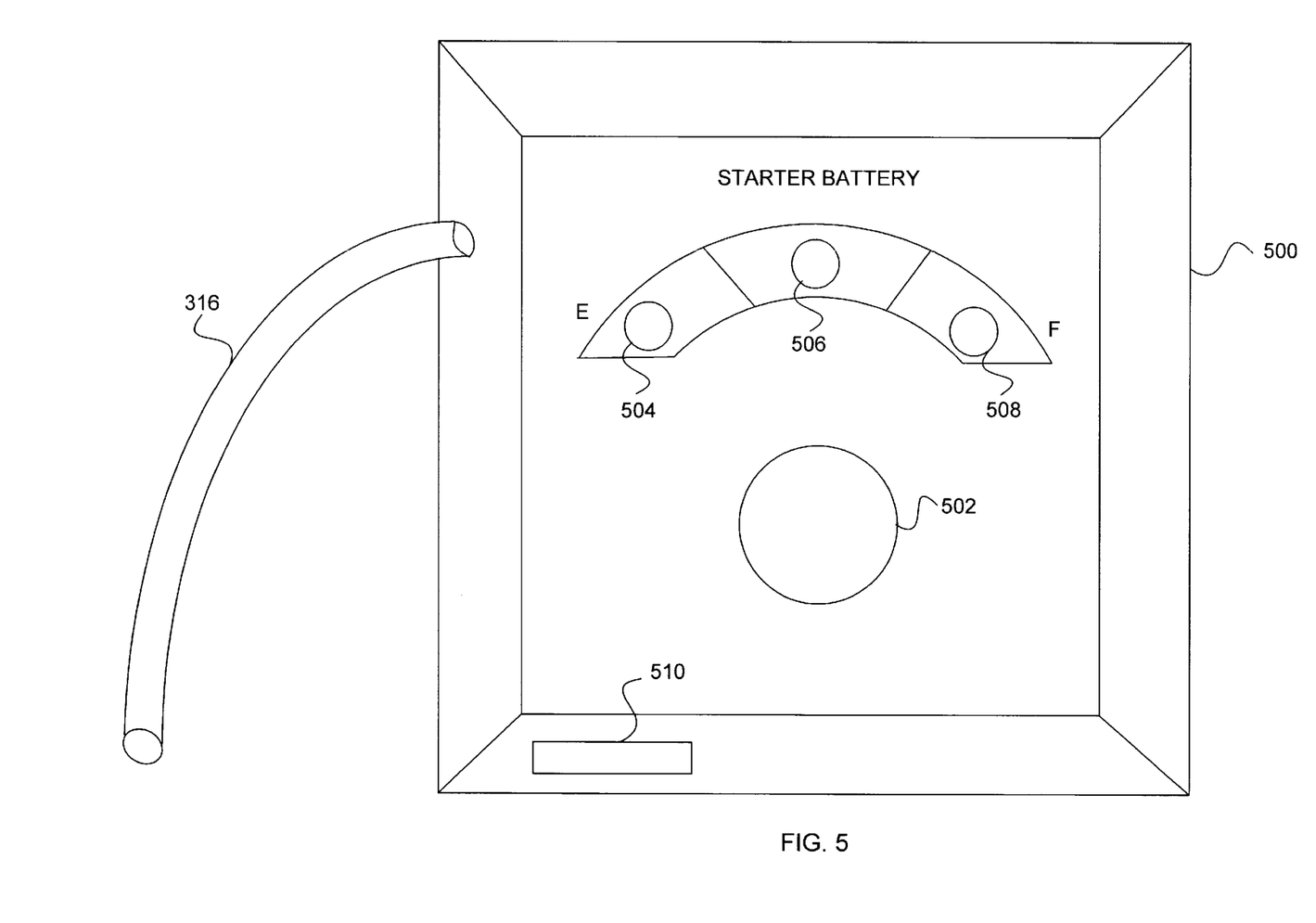
FIG. 5 shows a representation of a remote display panel of the multiple battery system of the present invention as shown in FIG. 3.

FIG. 5 shows a representation of a remote display panel of the multiple battery system of the present invention as shown in FIG. 3. Referring now to FIG. 5, remote display panel 500 is connected via remote display panel cable 316 to multiple battery system 300 (FIG. 3). Pressing activate button 502 sends a signal to the electronics control module triggering an output signal sent back to remote display panel 500 regarding the status of the starter battery. If the starter battery needs recharging, then the signal sent back from the electronics control module will activate needs recharging indicator 504. If the starter battery is usable, then the signal sent back from the electronics control module will activate usable indicator 506. If the starter battery is fully charged, then the signal sent back from the electronics control module will activate fully charged indicator 508. If the auxiliary battery should become fully discharged, an audible beep or tone from speaker 510 will sound, indicating to the operator that the auxiliary battery needs to be recharged immediately.

Figure 6:
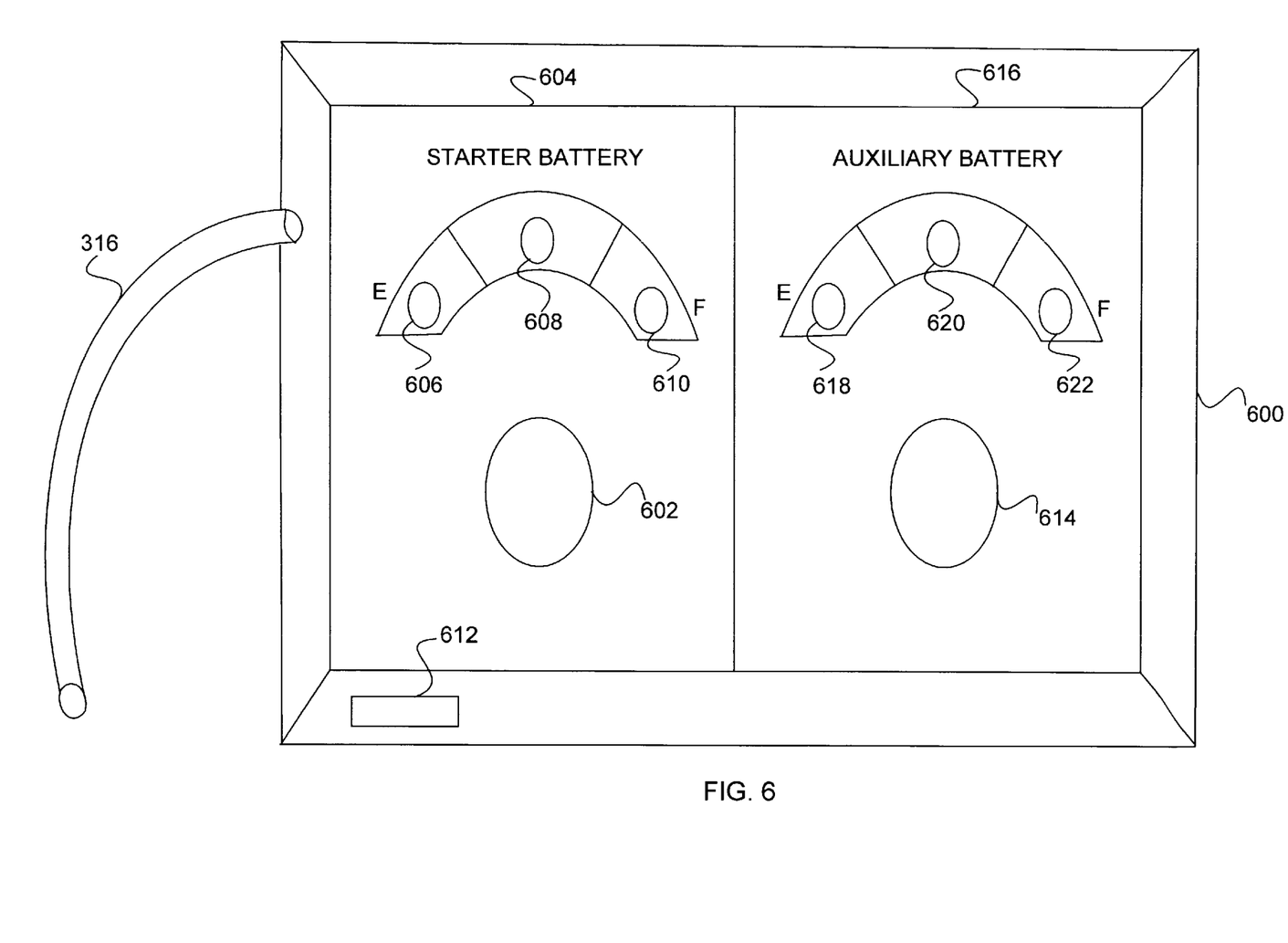
FIG. 6 shows another representation of a remote display panel of the multiple battery system of the present invention as shown in FIG. 3.

FIG. 6 shows another representation of a remote display panel of the multiple battery system of the present invention as shown in FIG. 3. Referring now to FIG. 6, remote display panel 600 is connected via remote display panel cable 316 to multiple battery system 300 (FIG. 3). Pressing activate button 602 sends a signal to the electronics control module triggering an output signal sent back to starter battery section 604 of remote display panel 600 regarding the status of the starter battery. If the starter battery needs recharging, then the signal sent back from the electronics control module will activate needs recharging indicator 606. If the starter battery is usable, then the signal sent back from the electronics control module will activate usable indicator 608. If the starter battery is fully charged, then the signal sent back from the electronics control module will activate fully charged indicator 610. If the auxiliary battery should become fully discharged, an audible beep from speaker 612 will sound, indicating to the operator that the auxiliary battery needs to be recharged immediately.

Pressing activate button 614 sends a signal to the electronics control module triggering an output signal sent back to auxiliary battery section 616 of remote display panel 600 regarding the status of the auxiliary battery. If the auxiliary battery needs recharging, then the signal sent back from the electronics control module will activate needs recharging indicator 618. If the auxiliary battery is usable, then the signal sent back from the electronics control module will activate usable indicator 620. If the auxiliary battery is fully charged, then the signal sent back from the electronics control module will activate fully charged indicator 622.

Figure 7:
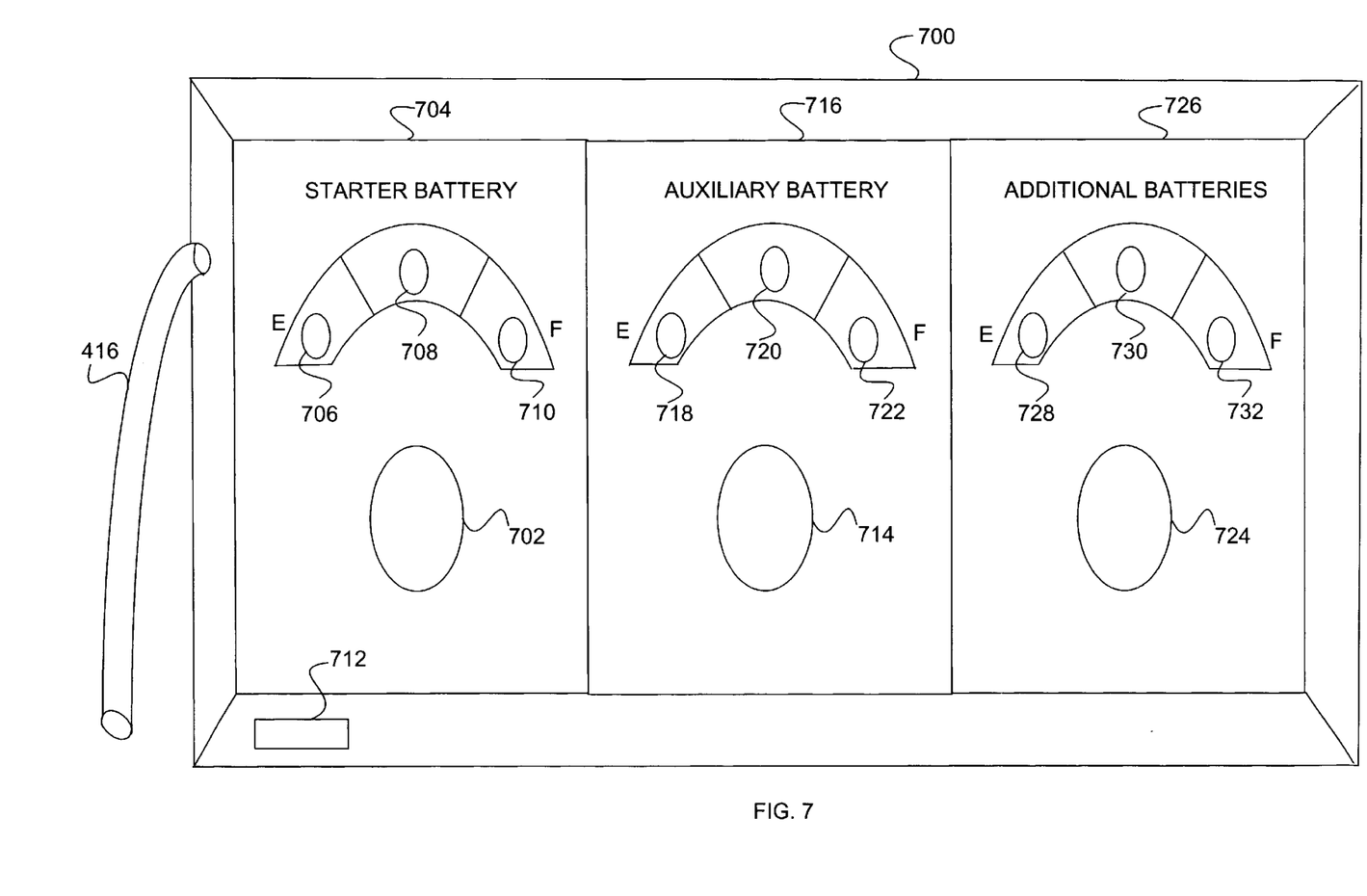
FIG. 7 shows another representation of a remote display panel of the multiple battery system of the present invention having one or more additional connected batteries as shown in FIG. 4.

FIG. 7 shows another representation of a remote display panel of the multiple battery system of the present invention having one or more additional connected batteries as shown in FIG. 4. Referring now to FIG. 7, remote display panel 700 is connected via remote display panel cable 416 to multiple battery system 400 (FIG. 4). Pressing activate button 702 sends a signal to the electronics control module triggering an output signal sent back to starter battery section 704 of remote display panel 700 regarding the status of the starter battery. If the starter battery needs recharging, then the signal sent back from the electronics control module will activate needs recharging indicator 706. If the starter battery is usable, then the signal sent back from the electronics control module will activate usable indicator 708. If the starter battery is fully charged, then the signal sent back from the electronics control module will activate fully charged indicator 710. If the auxiliary battery should become fully discharged, an audible beep from speaker 712 will sound, indicating to the operator that the auxiliary battery needs to be recharged immediately.

Pressing activate button 714 sends a signal to the electronics control module triggering an output signal sent back to auxiliary battery section 716 of remote display panel 700 regarding the status of the auxiliary battery. If the auxiliary battery needs recharging, then the signal sent back from the electronics control module will activate needs recharging indicator 718. If the auxiliary battery is usable, then the signal sent back from the electronics control module will activate usable indicator 720. If the auxiliary battery is fully charged, then the signal sent back from the electronics control module will activate fully charged indicator 722.

Pressing activate button 724 sends a signal to the electronics control module triggering an output signal sent back to additional battery section 726 of remote display panel 700 regarding the status of the additional battery. If the additional battery needs recharging, then the signal sent back from the electronics control module will activate needs recharging indicator 728. If the additional battery is usable, then the signal sent back from the electronics control module will activate usable indicator 730. If the additional battery is fully charged, then the signal sent back from the electronics control module will activate fully charged indicator 732.

Figure 8:
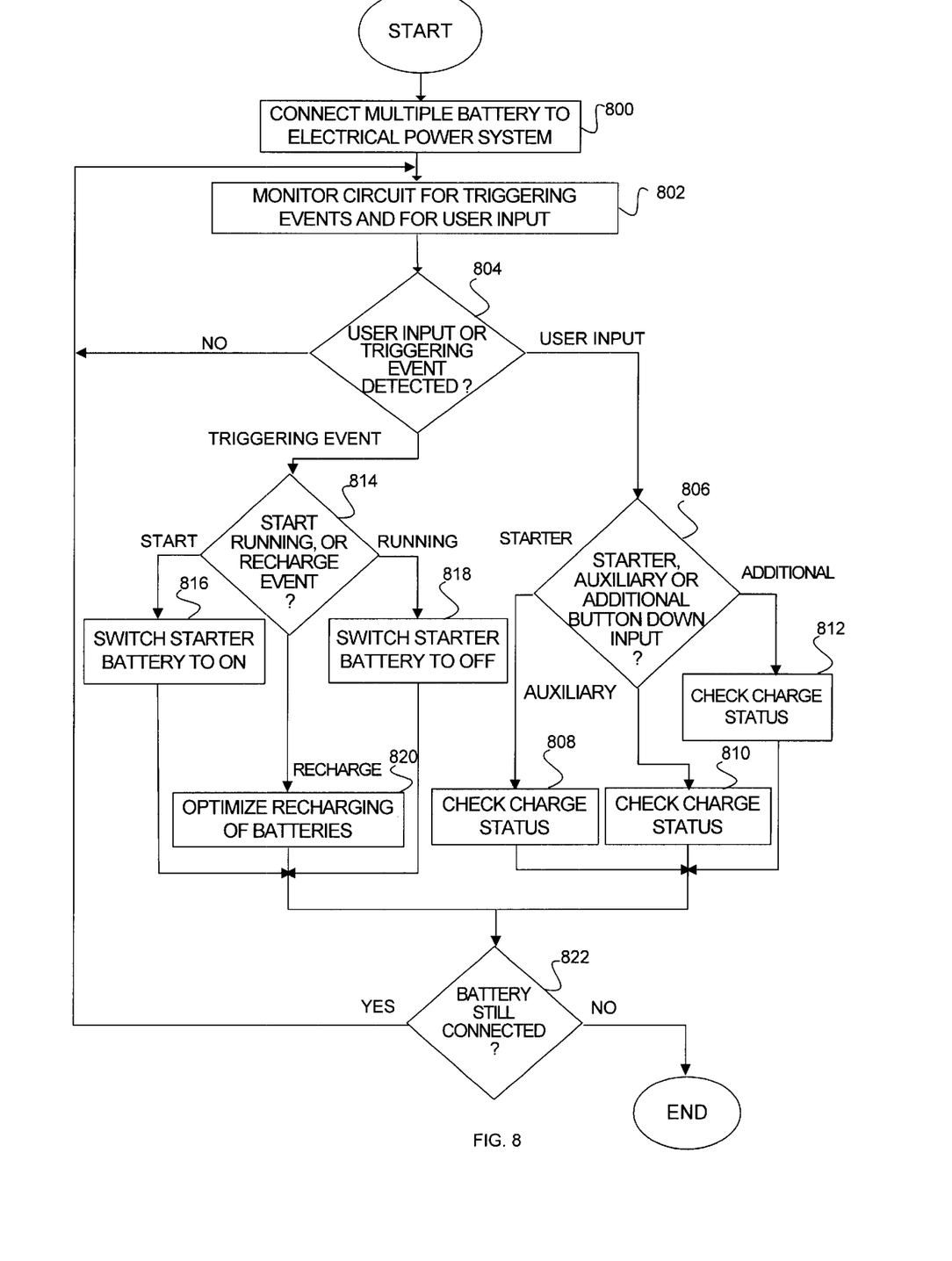
FIG. 8 is a flow chart of the multiple battery method of the present invention.

FIG. 8 is a flow chart of the multiple battery method of the present invention. Referring now to FIG. 8, in step 800 the multiple battery is connected to the electrical power system of a boat or vehicle, activating the electronics control module. In step 802 the electronics control module begins monitoring the parallel circuit for triggering events and waits for user input from the remote display panel. If in step 804 it is determined that no triggering event occurred and no user input was received, then control returns to step 802. If step 804 determines that user input was received, then step 806 determines if the user input was a starter battery button down input (a signal generated when the user presses the starter battery button on the remote display panel and is received in the electronics control module), auxiliary battery button down input (a signal generated when the user presses the auxiliary battery button on the remote display panel and is received in the electronics control module), or additional battery button down input (a signal generated when the user presses the additional battery button on the remote display panel and is received in the electronics control module).

If starter battery button down input was received in step 806, then in step 808 the electronics control module checks the charge status of the starter battery and returns a signal indicating that status to the starter battery section of the remote display panel, activating the appropriate indicator. If auxiliary battery button down input was received in step 806, then in step 810 the electronics control module checks the charge status of the auxiliary battery and returns a signal indicating that status to the auxiliary battery section of the remote display panel, activating the appropriate indicator. Similarly, if additional battery button down input was received in step 806, then in step 812 the electronics control module checks the charge status of the additional battery and returns a signal indicating that status to the additional battery section of the remote display panel, activating the appropriate indicator. After any of steps 808, 810, or 812, control then passes to step 822.

If step 804 determines that a triggering event was detected, then step 814 determines if the triggering event was a start event, an engine running event, or a recharge event. If a start event was detected in step 814, then in step 816 the electronics control module sends an on signal to a switch that connects the starter battery to the parallel circuit. If an engine running event was detected step 814, then in step 818 the electronics control module sends an off signal to a switch that disconnects the starter battery from the parallel circuit. Similarly, if a recharge event was detected in step 814, then in step 820 the electronics control module optimizes the recharging of the starter battery, the auxiliary battery, or the additional battery. After any of steps 816, 818, or 820, control then passes to step 822.

Step 822 determines if the battery is still connected to the electrical loads. If yes, control returns to step 802. If not, such as when storage mode switch 322 (FIG. 3) or storage mode switch 422 (FIG. 4) are pressed, the multiple battery method ends.

Having described a presently preferred embodiment of the present invention, it will be understood by those skilled in the art that many changes in construction and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

We claim:

1. A multiple battery method for a vehicle comprising:

(a) monitoring a circuit having an electrical load with an electronics control module;

(b) detecting a start event, an engine running event, a recharge event or user input in said circuit with said electronics control module;

(c) when a start event is detected, connecting a starter battery to the electrical load; when an engine running event is detected, disconnecting the starter battery and connecting an auxiliary battery to the electrical load; and when a recharge event is detected optimizing the recharging of the starter battery and auxiliary battery with the electronics control module; and (d) when a user input is detected, checking and displaying a charge status of the first or second battery.

2. A multiple battery system comprising:

a starter battery and an auxiliary battery switchably connected to a parallel circuit, the circuit being configured for connection to an electrical load;

an electronics control module that monitors the circuit for start events and charge status requests, the control module connecting the starter battery to the circuit when a start event is detected and generating signals indicative of the starter and auxiliary battery charge status when a charge status request is detected; and a display for showing the charge status of the starter and auxiliary batteries.

3. A multiple battery system as claimed in claim 2, wherein the electronics control module also monitors the circuit to determine when the batteries need recharging and, when charging current is available, initiates a recharge process that decreases the charging current as the batteries charge back up.

4. A multiple battery system as claimed in claim 3, and further comprising one or more additional batteries switchably connected in parallel to the starter battery and auxiliary battery.

5. A multiple battery system as claimed in claim 4, and further comprising a remote display panel for displaying the battery charge status.

6. A multiple battery system as claimed in claim 5, and further comprising a storage mode switch for disconnecting all batteries from the circuit.

* * * * *